United States Patent [19]

Hunninghaus et al.

[11] 4,338,813

[45] Jul. 13, 1982

[54] ELECTRONIC ENGINE SYNCHRONIZATION AND TIMING APPARATUS

[75] Inventors: Roy E. Hunninghaus, Des Plaines; Randy L. Bolinger, Schaumburg, both of Ill.

[73] Assignee: Motorola Inc., Schaumburg, Ill.

[21] Appl. No.: 183,657

[22] Filed: Sep. 2, 1980

[51] Int. Cl.$^3$ .......... G01M 15/00

[52] U.S. Cl. .......... 73/116

[58] Field of Search .......... 73/116, 117.3, 119 A; 123/406, 414, 416, 417, 472; 324/397

[56] References Cited

U.S. PATENT DOCUMENTS

| | | | |
|---|---|---|---|
| 3,661,126 | 5/1972 | Baxendale | 123/32 EA |
| 3,702,601 | 11/1972 | Gordon | 123/32 EA |
| 3,757,755 | 9/1973 | Carner | 123/148 E |
| 3,838,397 | 9/1974 | Watson et al. | 340/172.5 |
| 3,906,207 | 9/1975 | Rivere et al. | 235/150.2 |
| 3,971,348 | 7/1976 | Scofield | 123/32 EA |
| 3,982,519 | 9/1976 | Moon | 123/179 L |
| 4,002,152 | 1/1977 | Hoshi | 123/32 EA |
| 4,003,350 | 1/1977 | Eisele et al. | 123/32 EA |
| 4,027,641 | 6/1977 | Moder | 123/179 L |
| 4,040,397 | 8/1977 | Leichle | 123/32 AE |
| 4,082,066 | 4/1978 | Long | 123/32 EA |
| 4,086,884 | 5/1978 | Moon | 123/32 EB |
| 4,094,274 | 6/1978 | Harada et al. | 123/32 EL |
| 4,095,576 | 6/1978 | Hattori et al. | 123/148 E |
| 4,096,841 | 6/1978 | Kindermann | 123/148 E |
| 4,100,895 | 7/1978 | Hattori et al. | 123/117 R |
| 4,104,990 | 8/1978 | Frobenius | 123/32 EA |
| 4,138,976 | 2/1979 | Crall | 123/117 R |
| 4,150,653 | 4/1979 | Grancoin | 123/148 E |
| 4,210,111 | 7/1980 | Hattori et al. | 123/414 |

*Primary Examiner*—Jerry W. Myracle

*Attorney, Agent, or Firm*—James W. Gillman; James S. Pristelski; Phillip H. Melamed

[57] ABSTRACT

Electronic engine synchronization and timing apparatus for use in controlling fuel injection and/or spark ignition for an internal combustion engine is disclosed. An engine crankshaft rotates a rotary body having a plurality of radial projections, and a single crankshaft reluctance sensor is utilized to provide pulses in response to the passage of these projections and thereby provide a signal related to crankshaft position. An engine camshaft rotates a rotary body with radial projections at half of the crankshaft speed, and a pair of camshaft sensors provide signals in response to the passage of the camshaft projections which are indicative of the rotational position of the camshaft. The signals provided by the crankshaft and camshaft sensors are received by circuitry which provides a crankshaft reference signal having transitions of alternate predetermined polarities at specific rotational positions of the crankshaft and also provides cylinder identification signals which are indicative of the angular rotational position of the camshaft rotary body. These signals are then utilized by conventional electronic fuel injection and/or spark ignition control apparatus to control engine cylinder operations in the proper sequence and at the proper time.

17 Claims, 2 Drawing Figures

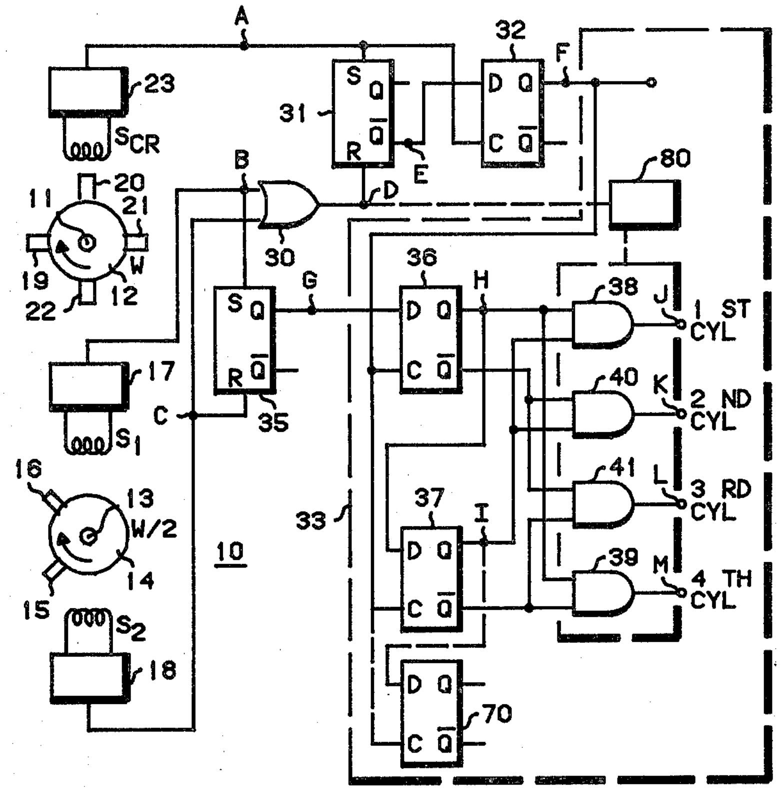
FIG. 1
FIG. 2
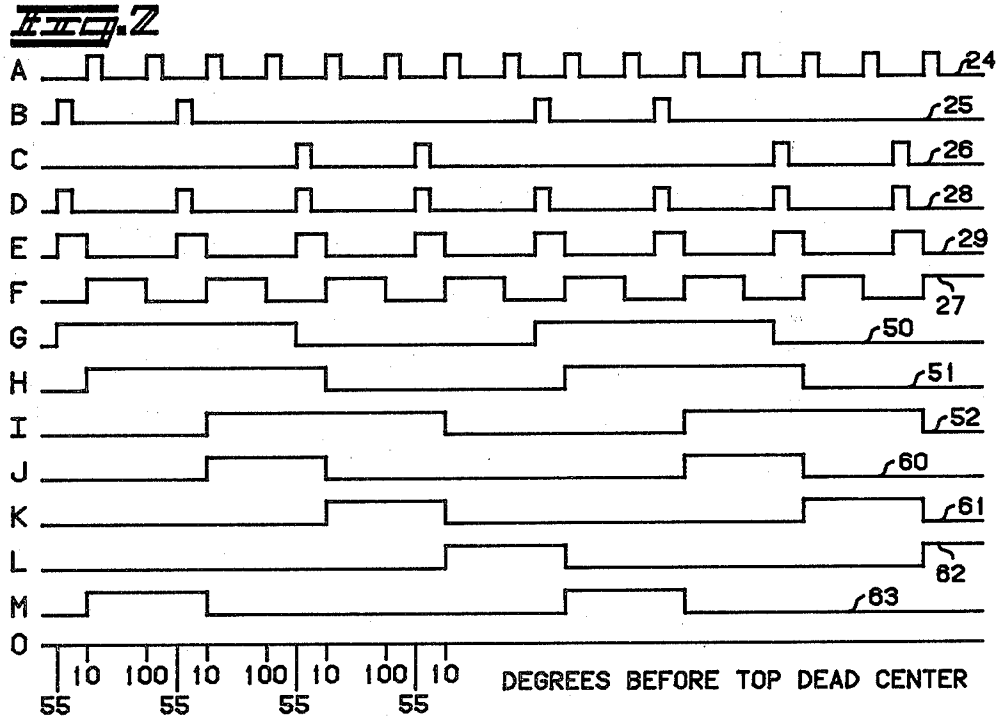

ELECTRONIC ENGINE SYNCHRONIZATION AND TIMING APPARATUS

CROSS REFERENCE TO RELATED APPLICATIONS

The present invention is related to the invention described in a copending U.S. patent application entitled "Electronic Cylinder Identification Apparatus for Synchronizing Fuel Injection" by Randy Bolinger, Ser. No. 183,658, filed Sept. 2, 1980, and assigned to the same assignee as the present invention.

BACKGROUND OF THE INVENTION

The present invention generally relates to the field of electronic engine control circuits for use in the synchronization and timing of engine control functions such as fuel injection and spark ignition occurrence. More particularly, the present invention relates to the use of engine crankshaft and engine camshaft electronic position sensors for deriving cylinder identification information as well as precise engine crankshaft position information.

For electronic control of the operation of a multi-cylinder internal combustion engine, typically it is necessary to identify when a piston of a reference cylinder of a multi-cylinder engine is at a particular position in its reciprocal cycle. Typically this cylinder identification information is used to insure the proper sequencing of fuel into each cylinder and/or to insure the proper sequencing of a spark occurrence signal to each cylinder. The cylinder piston position directly corresponds to the angular position of the engine camshaft which is rotated at one half of the rotational speed of the engine crankshaft which supplies the reciprocal driving movement to the cylinder piston. Many types of cylinder identification techniques are known and some of these are described in detail in the copending U.S. patent application referred to above. That application describes an additional cylinder identification technique in which the cylinder piston position, which is directly related to the engine camshaft angular position, is determined by two camshaft sensors sensing the passage of a plurality of camshaft projections and determining the angular position of the camshaft by determining which of the two sensors is presently producing a camshaft position pulse and which of the sensors previously produced a camshaft sensor pulse.

In electronic engine control it is also necessary to provide very accurate information with regard to the angular rotational position of the engine crankshaft. Typically, the required resolution accuracy cannot be obtained by merely using engine camshaft sensors since the physical dimensions of the engine generally prohibit the use large diameter rotary bodies attached to the engine camshaft. In addition, when sensing engine crankshaft positions, if a plurality of projections are provided on the engine crankshaft, then some technique to distinguish between the pulses produced by these plurality of projections must be developed. In some instances, one of a plurality of the engine crankshaft projections is formed in a special manner so that it serves as a reference crankshaft projection. However, this means that almost a full revolution of the engine crankshaft may have to occur before enough information is gathered to properly identify the true angular position of the engine crankshaft. During the start-up of an automobile engine, this time delay would be detrimental.

In some electronic engine control systems utilizing crankshaft position sensors, profile (proximity) sensors are utilized to obtain rising and falling signal transitions each of which represents a different desired rotational position of the engine crankshaft corresponding to the widely spaced rising and falling edges of the peripheral crankshaft projections. While this type of signal is readily usable by engine control microprocessors, the cost of such profile sensors is typically far more than the cost of reluctance sensors which merely produce identical polarity transitions at desired predetermined engine crankshaft rotational positions. In addition, such profile sensors generally incorporate electronics into the sensor body and this electronics is subject to extreme environmental conditions which inherently affect the reliability of such sensors.

SUMMARY OF THE PRESENT INVENTION

An object of the present invention is to provide an improved electronic engine synchronization and timing circuit which overcomes the above-mentioned deficiencies of prior circuits while providing information with respect to both the angular rotational position of the engine camshaft and crankshaft.

A more particular object of the present invention is to provide an electronic engine synchronization and timing circuit which requires only three sensors, which can preferably be of the reluctance sensor type, and wherein such apparatus can provide all of the required synchronization and timing information for four, six, and eight cylinder engines.

In one embodiment of the present invention, an electronic engine synchronization and timing circuit is provided which comprises: an engine crankshaft driven by an engine at variable speeds and providing cyclic driving movement for engine cylinder pistons; a crankshaft body rotated about an axis by the crankshaft and having a plurality of peripheral portions spaced about said axis; crankshaft sensor means positioned stationary about said crankshaft body for sensing the rotational position of the crankshaft body and developing, in response to the passage of said peripheral portions of said crankshaft body, a crankshaft reference signal having alternating positive and negative logic states with state transitions of predetermined polarities at predetermined rotational positions of the engine crankshaft; an engine camshaft rotated at one half of the rotational speed of the engine crankshaft; a camshaft body rotated about an axis by the camshaft and having a plurality of peripheral portions spaced within 180 degrees of angular rotation about said axis; at least a first stationary camshaft sensor means positioned about the camshaft body for sensing the rotational position of the camshaft body peripheral portions and providing in response thereto camshaft sensor signal position pulses whose occurrence is related to predetermined camshaft positions; and circuitry for receiving both said crankshaft reference signal and said camshaft signals pulses and providing at least one cylinder identification reference signal indicative of one particular camshaft rotational position by distinguishing between the various camshaft signal pulses by determining if said camshaft signal pulses occur during two sequential identical polarity states of said crankshaft reference signal, whereby said crankshaft reference signal is utilized not only to provide precise signal transitions related to specific rotational positions of the engine crankshaft, but is also utilized in identifying a specific camshaft reference rotational position.

Basically, the function of the apparatus recited in the previous paragraph is to provide cylinder identification information through the use of an engine crankshaft position reference signal which has alternating positive and negative logic states with alternating polarity transitions occurring at known desired rotational positions of the engine crankshaft. Essentially, generating such an engine crankshaft reference signal is required to obtain accurate information regarding engine speed and also to initiate timing calculations for predicting when a spark signal should occur for each cylinder and/or predicting precisely when fuel should be injected into each cylinder. The present invention utilizes this engine crankshaft reference signal, in conjunction with sensor signals produced by at least one camshaft sensor, to also create a cylinder identification signal, and this dual use of the engine crankshaft reference signal eliminates some of the circuitry which would be required if cylinder identification information had to be obtained through only the use of engine camshaft sensor signals.

According to another feature of the present invention, an electronic engine synchronization and timing circuit is provided which comprises: an engine crankshaft driven by an engine at variable speeds and providing cyclic driving movement for engine cylinder pistons; a crankshaft body rotated about an axis by the crankshaft and having a plurality of identical peripheral portions spaced about said crankshaft; crankshaft sensor means positioned stationary about said crankshaft body for providing a plurality of identical pulse transitions at various predetermined crankshaft positions in response to the passage of said crankshaft peripheral portions; and engine camshaft rotated at one half the rotational speed of said crankshaft; a camshaft body rotated about an axis by the camshaft and having a plurality of identical peripheral portions; camshaft sensor means positioned stationary about said camshaft body for developing a plurality of pulses at various predetermined crankshaft positions in response to the passage of said camshaft peripheral portions; said camshaft body and said crankshaft body peripheral portions being arranged for providing a pair of crankshaft pulses between each of said camshaft pulses; and circuitry means for receiving said camshaft and crankshaft pulses and providing a crankshaft reference signal, said circuitry having means for utilizing said camshaft and crankshaft pulses to provide said crankshaft reference signal with a predetermined polarity transition in response to the first of said crankshaft pulse transitions occurring after said camshaft pulse and an opposite polarity transition in response to the next of said crankshaft pulse transitions, whereby the occurrence of said camshaft pulses is utilized to distinguish between the different crankshaft angular positions indicated by the identical polarity crankshaft pulse transitions.

According to the above-described feature of the present invention, effectively a reluctance type crankshaft sensor is utilized to provide identical polarity position pulse signal transitions at various desired rotational positions of the engine crankshaft. Circuitry receives the identical signal transitions from the engine crankshaft sensor, and also receives position pulse signals from at least two engine camshaft sensors, preferably of the reluctance type. To create the signal transitions and camshaft sensor signals projections are provided on rotary bodies rotated by the engine crankshaft and camshaft such that after each camshaft position pulse, two identical polarity crankshaft position pulse transitions occur. Circuitry receives the crankshaft position pulse transitions and the camshaft pulses and provides a crankshaft reference signal by creating a first polarity transition of the crankshaft reference signal in response to the first crankshaft pulse transition after a camshaft pulse and by creating an opposite polarity transition in the crankshaft reference signal in response to the next crankshaft sensor pulse transition after the camshaft pulse. In this manner, the present invention has effectively created a crankshaft reference signal having, for example, a positive transition at one rotational position of the engine crankshaft and a negative transition at another rotational position of the engine crankshaft, and this is accomplished without the use of a profile sensor by using a reluctance type sensor for the engine crankshaft and by using similar reluctance type sensors for sensing the rotational position of the engine camshaft.

BRIEF DESCRIPTION OF THE DRAWINGS

For a more complete understanding of the invention, reference should be made to the drawings, in which:

FIG. 1 is a schematic diagram illustrating an electronic engine synchronization and timing apparatus; and FIG. 2 is a series of graphs A through O which illustrate various waveforms and timing relationships for the apparatus shown in FIG. 1.

DESCRIPTION OF THE PREFERRED EMBODIMENTS

FIG. 1 illustrates a schematic diagram of an electronic engine control synchronization and timing apparatus 10 for use in controlling the fuel injection and/or spark timing of a multi-cylinder piston actuated internal combustion engine (not shown). The engine includes a crankshaft represented in FIG. 1 by an axis 11 about which a crankshaft rotary body 12 is rotated at various engine speeds designated by W. The engine crankshaft provides the cyclic driving movement for engine cylinder pistons for the engine which operates in a conventional manner as will be well understood to those skilled in the art. It should be noted that a complete cycle of the engine requires two piston cycles and two crankshaft revolutions, one piston cycle for the power stroke to compress fuel in the engine cylinder, and one for the exhaust stroke to expel combusted fuel from the cylinder.

FIG. 1 also illustrates an axis 13 representative of an engine camshaft which is rotated at one half of the rotational speed of the engine crankshaft. A rotary body 14 is rotated about the axis 13 by the engine camshaft. It should be noted that since the engine camshaft rotates at half of the speed of the engine crankshaft, one complete revolution of the engine camshaft represents a complete engine cycle for any cylinder piston and therefore by identifying a specific rotational position of the engine camshaft, this will indicate the exact cyclic position of one of the cylinder pistons and this information is conventionally utilized to initiate fuel injection into one reference cylinder at an appropriate time in the piston cycle while fuel is injected into other cylinders sequentially based upon the identification of the time when fuel was injected into the reference cylinder.

The synchronization and timing apparatus 10 as shown in FIG. 2 is illustrated for providing the proper synchronization and timing signals for a four cylinder engine, however, this circuit can be readily extended to provide such synchronization and timing signals for six and eight cylinder engines without any increase in the number of camshaft and crankshaft sensors as will be noted subsequently.

The camshaft rotary body 14 for the four cylinder apparatus 10 has two radially outward peripheral projections 15 and 16 spaced apart from each other about axis 13 by an angle of 90 degrees. It should be noted that the spacing of these projections 15 and 16 is within 180 degrees of camshaft revolution and the significance of this will be noted subsequently. First and second camshaft reluctance type sensors 17 and 18, respectively, are positioned at stationary locations about said camshaft rotary body 14 and spaced apart from each other about the axis 13 by 180 camshaft degrees.

The crankshaft rotary body 12 for the four cylinder apparatus 10 shown in FIG. 1 has a plurality of four radially outward peripheral projections 19 through 22 which are spaced apart from each other at 90 crankshaft degree intervals about the axis 11. One stationary crankshaft position sensor 23, of the reluctance type, is positioned about the rotary body 12. The crankshaft position sensor 23 will produce four crankshaft position pulses having identical polarity transitions at each of four distinct crankshaft rotational positions for every complete revolution of the rotary body 12. Thus, eight crankshaft position pulses will be provided for every complete engine cycle which is represented by two crankshaft revolutions and one complete revolution of the camshaft rotary body 14. FIG. 2A illustrates the waveform of a signal 24 representative of the signal provided by the crankshaft sensor 23 and this signal is provided to a terminal A in FIG. 1. For all of the graphs in FIG. 2, the vertical axis is magnitude and the horizontal axis is time and all of the horizontal axes are drawn to the same scale.

For reluctance type sensors such as sensor 23, it should be noted that they generally comprise a coil and magnetic circuit which is completed by the passage of a projection, such as one of the projections 19 through 22, causing an accurate pulse transition at a precise angular position of a rotary body such as body 12. It is contemplated that a first one of the pulses of the signal 24 shown in FIG. 2A will occur (have a positive transition) at an engine cycle position of 100 degrees before top dead center (BTC) of the piston during the fuel compression stroke for one of the four cylinders. It is contemplated that the second of the pulses in the signal 24 will occur at 10 degrees before top dead center of the piston in this same cylinder, and this sequence of timing will be continued for each of the subsequent pulses of the signal 24 as the cylinders 1 through 4 are stepped through due to the driving movement of the crankshaft rotating the crankshaft rotary body 12. These timings are illustrated in FIG. 20 which is drawn to the same horizontal time scale and indicates the angle occurrence of all pulses in engine crankshaft degrees.

The projections 15 and 16 on the camshaft rotary body 14 are positioned such that camshaft position pulses are provided by the sensors 17 and 18 at an angular position of approximately 55 degrees before top dead center for each of the four cylinders. The camshaft position pulses for sensor 17 are provided at a terminal B and are illustrated in FIG. 2B by a signal 25, while the pulses provided by the sensor 18 are provided to a terminal C and are illustrated by a signal 26 shown in FIG. 2C. It is contemplated that all of the sensors 17, 18 and 23 are of the reluctance type and therefore create only leading edge transitions which accurately reflect the rotational position of the camshaft or crankshaft. It is also contemplated that the camshaft rotary body 14 and its associated projections 15 and 16 will have a substantially smaller diameter than the crankshaft body and its projections thereby necessitating relying on the crankshaft sensor 23 to supply the accurate engine angular position information while the sensors 17 and 18 will supply cylinder identification information and, in the present invention, aid in distinguishing the 100 degree before top dead center crankshaft pulses from the 10 degree before top dead center crankshaft pulses.

It should be noted that the rotary bodies 12 and 14 are synchronously rotated, even though they are rotated at different speeds, by the internal combustion engine. This results in the fixed timing relationships which exist between the signals 24 through 26 shown in FIGS. 2A through 2C. The positioning of the peripheral projections and sensors in FIG. 1 for the engine crankshaft and the engine camshaft result in providing a pair of crankshaft pulses between each camshaft pulse provided by the combination of the sensors 17 and 18. It should also be noted that the positioning of these components results in providing, for each camshaft pulse provided by either of the sensors 17 or 18, an associated pair of engine crankshaft pulses for each camshaft pulse, with one of these crankshaft pulses (100° BTC) produced immediately prior to the engine camshaft pulse, and one of the crankshaft pulses (10° BTC) produced immediately after the camshaft pulse (at 55° BTC). The significance of these relationships will be discussed subsequently.

Essentially, the present invention utilizes the signals produced at the terminals A, B, and C to provide synchronization information which will positively identify the angular position of the engine camshaft within a mimimum amount of time, while also generating an engine crankshaft reference signal (27) having a negative transition at the 100 degree engine crankshaft pulses and a positive transition at the 10 degree engine crankshaft pulses. This results in the engine crankshaft reference signal having alternating positive and negative logic states with state transitions of known polarities occurring at precise known rotational positions of the engine crankshaft. This engine crankshaft reference signal is represented by the signal 27 shown in FIG. 2F.

The operation of the apparatus 10 will now be discussed with respect to how circuitry receives the signals at the terminals A, B, and C and provides cylinder identification information as well as generating the engine crankshaft reference signal 27. The circuit arrangement of the present invention differs from the arrangement described in the above-noted copending U.S. patent application which utilizes sensors corresponding to the camshaft position sensors 17 and 18 to generate cylinder identification information. The present system utilizes the crankshaft sensor 23 and its output signal 24 to provide cylinder identification information as well as to provide the crankshaft reference signal 27. Because of this dual use of the crankshaft sensor signal 24, the present invention minimizes some circuitry required for cylinder identification, and also provides the additional required crankshaft reference signal 27. It is contemplated that the signal 27, along with cylinder identification information, will be utilized to control a fuel injection control circuit for determining the time and sequencing of fuel injection into the cylinders of an internal combustion engine, as well as possibly controlling the distribution of spark timing signals to the various engine cylinders at desired times for spark occurrence. Such utilization circuits are discussed in the above noted copending application and are conventional and will therefore not be discussed.

The terminals B and C at which the camshaft sensor signals 25 and 26 are produced, respectively, are coupled as inputs to an OR gate 30 which has its output coupled to a terminal D that is connected to the reset terminal (R) of a set-reset flip-flop 31. The terminal A at which the crankshaft sensor signal 24 is provided is connected to the set terminal (S) of the flip-flop 31 and is also connected to a clock terminal (C) of a D-type flip-flop 32 (actuable on positive transitions at its clock terminal) which receives an input to its data terminal (D) from a terminal E that is directly coupled to the inverted output terminal ($\bar{Q}$) of the flip-flop 31. A non-inverted output terminal (Q) of the flip-flop 32 is coupled to a terminal F at which the crankshaft reference signal 27 is produced, and the terminal F is also coupled as an input to a conventional fuel injection and spark timing control circuit which controls the fuel injection and spark timing for the internal combustion engine wherein this conventional circuit is illustrated by the dashed component 33 wherein non-standard portions of the component 33 are further illustrated and wherein it is contemplated that the component 33 includes an engine control microprocessor for calculating desired engine time occurrences based upon the signal 27 provided at the terminal F.

Essentially, the OR gate 30 combines the signals 25 and 26 to produce a signal 28 at the terminal D and this signal is illustrated in FIG. 2D. By applying this signal 28 to the reset terminal of the flip-flop 31, and by applying the signal 24 to the set terminal of the flip-flop 31, a signal 29 at the terminal E is produced and this signal is illustrated in FIG. 2E. By utilizing the signal 29 as the data input for the flip-flop 32, and utilizing the positive going transitions of the signal 24 to actuate the D type flip-flop 32 by coupling these transitions to the clock terminal, the flip-flop 32 essentially acts as a gate circuit which samples the signals at the terminal E during the positive transitions of the signal 24 and thereby produces the crankshaft reference signal 27 at the terminal F. The significance of this is as follows.

While the signal 24 contains all of the desired crankshaft reference positions by virtue of its positive transitions being located at precisely 100 degrees and 10 degrees before top dead center for each of the cylinders, because the sensor 23 is a reluctance type sensor, all of this information is contained in the identical polarity positive transitions of the signal 24. Thus, without any further signal processing, it would be impossible to distinguish a 100 degree before top dead center transition of the signal 24 from a 10 degree before top dead center transition. This ambiguity could have been eliminated through the use of a more expensive profile type sensor and by reconfiguring the peripheral projections such that, for example, the falling edge of a signal would be produced at 100 degrees before top dead center and the rising edge of a signal would be produced at 10 degrees before top dead center. However, the present invention eliminates the need for an expensive profile sensor through signal processing of the signal 24 in combination with the signals 25 and 26.

Essentially, the components 30 through 32 provide circuitry which receives the signals 24 through 26 and produces the signal 27 at the terminal F. This is accomplished by utilizing the camshaft signals 25 and 26 to reset the flip-flop 31 such that upon the occurrence of the crankshaft positive pulse transition that occurs immediately after the camshaft pulse, one polarity of logic state will be produced at the terminal F while in response to the next crankshaft sensor positive pulse transition, the flip-flop 32 will now sample a different logic state output of the flip-flop 31 resulting in altering the logic state of the signal 27 at the terminal F. The end result is that the camshaft position pulse signals 25 and 26 are utilized in conjunction with the crankshaft signal 24 to provide the crankshaft reference signal 27 with a negative pulse transition at 100 degrees before top dead center and a positive pulse transition at 10 degrees before top dead center. Thus the three sensor signals have been utilized to effectively distinguish between the identical polarity transitions of the signal 24 and thereby correctly identify which of these identical pulse transitions corresponds to a precise angular position of the crankshaft rotary body 12.

The remaining circuitry of the present invention illustrates how the crankshaft reference signal 27 is utilized in conjunction with the camshaft position pulses 25 and 26 to provide cylinder identification information. A similar type system is illustrated in the copending U.S. patent application referred to above, but that application just utilizes the information from sensors corresponding to the sensors 17 and 18 and does not take advantage of the fact that the signal 27 at the terminal F will generally need to be generated in any electronic synchronization and timing apparatus and that this signal can therefore be utilized to assist in the proper cylinder identification.

The camshaft position signal 25 at the terminal B is provided as an input to a set terminal of a set reset flip-flop 35 while the signal 26 at the terminal C is provided to the reset terminal of this flip-flop. The non-inverted output terminal of the flip-flop 35 is coupled to a terminal G and is provided as an input to the data terminal of a D type flip-flop 36 which has its clock terminal, which is actuable on positive transitions, directly coupled to the terminal F. The non-inverted output of the flip-flop 36 is coupled to a terminal H which is directly coupled as an input to the data terminal of a D type flip-flop 37 and to AND gates 38 and 39. The clock terminal of the flip-flop 37 (actuable on positive transitions) is directly coupled to the terminal F and the non-inverted output of the flip-flop 37 is coupled to a terminal I which is coupled as an input to AND gate 38 and an AND gate 40. The inverted output of the flip-flop 36 is coupled as an input to AND gate 40 and an AND gate 41, and the inverted output of the flip-flop 37 is coupled as an input to the AND gates 39 and 41. The outputs of the AND gates 38 through 41 are coupled to the terminals J, M, K, and L respectively, as shown in FIG. 1.

Essentially, the flip-flop 35 receives the cam position pulses 25 and 26 and produces in response thereto an effectively latched output signal 50 at the terminal G, and this signal is illustrated in FIG. 2G. The components 36 through 40 are illustrated as lying within the control circuit 33 and would generally be implemented by a microprocessor contained within the circuit 33. It should be noted that the circuit 33 is contemplated as receiving all necessary engine position and cylinder identification information by virtue of its receipt of the signals 50 and 27.

The flip-flop 36 receives the signal 50 at its data terminal and due to the clock terminal of this flip-flop receiving the signal 27 at the terminal F, this flip-flop produces a signal 51 at the terminal H and this signal is illustrated in FIG. 2H. Essentially, the signal 51 corresponds to the latched signal 50 except shifted in time such that its leading and trailing edges now correspond to the 10 degree before top dead center crankshaft pulses that occur after one of the sensors 17 or 18 provides a camshaft position pulse after the other sensor produced the previous camshaft position pulse. Thus, the signal 51 actually corresponds to a delayed version of the signal 50 wherein this delay is caused through the utilization of the engine crankshaft reference signal 27. The delayed signal 51 is then supplied as an input to the flip-flop 31 and due to this flip-flop receiving the signal 27 at its clock terminal, a signal 52 is provided at the output terminal I and the signal is illustrated in FIG. 3I.

By coupling the signals at the terminals H and I to the plurality of AND gates 38 through 41, and by coupling the inverted versions of these signals also to these AND gates, as illustrated in FIG. 1, the signal outputs of the AND gates provided at the terminals J through M (signals 60–63 which are illustrated in FIGS. 2J–2M, respectively) will result in providing cylinder identification reference signal information in response to the sequential occurrence of any two camshaft pulses of the signals 25 and 26 wherein the sequence of occurrence of these pulses results in providing a cylinder identification reference signal at any one of the terminals J through M. Thus, for example, in response to the occurrence of two sequential camshaft pulses in the signal 25 provided by the sensor 17, a high logic state of a signal 60 is provided at the terminal J indicating the selection of the first cylinder, whereas the sequence of a camshaft position pulse first being provided by the sensor 17 and then being provided by the sensor 18 would result in a high logic state of a signal 61 at the terminal K indicating that the camshaft rotary body 14 was now in a position such that the second engine cylinder is being referenced at a particular point in its cycle.

Essentially, the cylinder identification is provided by comparing which of the sensors 17 and 18 is presently producing a cam position pulse and then also noting which of these sensors produced the previous cam position pulse. This is accomplished by utilizing the positive transitions of signal 27 to trigger effective gate sampling circuitry (flip-flops 36 and 37) to determine which camshaft pulses were produced prior to each signal 27 positive transition. In this manner, it is possible to identify the exact rotational position of the camshaft rotary body 14 by the time two camshaft position pulses are produced. The advantages of this type of configuration are explained in the copending U.S. patent application previously referred to and generally comprise providing a rapid determination of cylinder reference position while utilizing a minimum number of sensors. The present invention improves upon the basic system described in the previously mentioned patent application by utilizing the crankshaft reference signal 27 to create a signal delay that is required in order to compare the previous and present cam sensor pulse information and thereby provide the proper reference cylinder identification information.

It should be noted that the present invention can function by utilizing the crankshaft reference signal 27 in conjunction with camshaft pulses from only one camshaft sensor to provide cylinder identification information by noting for every two identical polarity (low) states of the signal 27, the occurrence or non-occurrence of camshaft pulses by any one of the camshaft sensors. This can be seen by noting the waveforms in FIG. 2. If desired, a crankshaft profile sensor could directly generate the signal 27 in which case only one camshaft sensor would be required in addition to the profile crankshaft sensor.

While FIG. 1 illustrates the configuration for a four cylinder synchronization and timing apparatus, it can readily be expanded with a minimum number of additional components to function for six and eight cylinder engines. More specifically, for a six cylinder engine, cylinder identification and timing information can be provided by replacing the cam peripheral projections 15 and 16 by three cam projections spaced from each other by approximately 60 degrees of camshaft revolution and positioned at 40 degrees of crankshaft angle before top dead center, wherein it should be noted that the three camshaft projections still lie within 180 degrees of camshaft revolution and that still only two camshaft sensors 17 and 18 are required. In addition to utilizing three camshaft projections, a total of six crankshaft projections should be utilized wherein three of these would be positioned at 10 degrees before top dead center and three of them would be positioned at 70 degrees before top dead center, wherein each of the crankshaft projections would be spaced apart from each other at 60 degrees of crankshaft angle. The only modifications to the circuitry of the apparatus shown in FIG. 10 would be that an additional flip-flop 70 (shown dashed) would need to be added to the circuit 33 so as to compare three camshaft pulses before having the AND gate string, which would now comprise six AND gates instead of four, provide an output signal which would properly identify a reference cylinder. Similar modifications to the apparatus in FIG. 1 can be made to accommodate an eight cylinder engine by using an additional flip-flop, eight AND gates, four camshaft projections spaced 45 camshaft degrees apart, and eight crankshaft projections spaced 45 crankshaft degrees apart, and this eight cylinder system is realized without adding any additional sensors other than the sensors 17, 18 and 23.

It should be noted that since even for the four cylinder engine apparatus shown in FIG. 10, the AND gates 38 through 41 will not produce proper cylinder identification outputs until at least two camshaft position pulses, it may be desired to have an inhibiting circuit 80 (shown dashed) which receives its input from the terminal D and prevents the AND gates 38 through 41 from providing any output until at least two camshaft position pulses have occurred. Such an inhibiting circuit could comprise a small capacity counter which would subsequently trigger a latch circuit that would effectively enable the AND gates 38 through 41 to provide an output wherein the latch would provide a high output in response to a count of two indicating two position pulses and this high output would be coupled as another input to each of the AND gates.

While I have shown and described specific embodiments of this invention, further modifications and improvements will occur to those skilled in the art. Such modifications could of course include the utilization of the apparatus 10 shown in FIG. 1 to control the spark timing occurrence and the distribution of spark in a distributorless ignition system, as well as utilizing the apparatus 10 to control the proper sequence and timing of the fuel injection. All such modifications which retain the basic underlying principles disclosed and claimed herein are within the scope of this invention.

I claim:

1. An electronic engine synchronization and timing circuit comprising:

an engine crankshaft driven by an engine at variable speeds and providing cyclic driving movement for engine cylinder pistons;

a crankshaft body rotated by the crankshaft about an axis and having a plurality of peripheral portions spaced about said axis;

crankshaft sensor means positioned stationary about said crankshaft body for sensing the rotational position of the crankshaft body and developing, in response to the passage of said peripheral portions of said crankshaft body, a crankshaft reference signal having alternating positive and negative logic states with state transitions of predetermined polarities at predetermined rotational positions of the engine crankshaft;

an engine camshaft rotated at one half of the rotational speed of the engine crankshaft;

a camshaft body rotated about an axis by the camshaft and having a plurality of spaced apart peripheral portions positioned within less than 180 degrees of angular rotation about said axis;

at least a first stationary camshaft sensor means positioned about the camshaft body for sensing the rotational position of the camshaft body peripheral portions and providing in response thereto camshaft sensor signal pulses whose occurrence is related to predetermined camshaft positions; and circuitry means for receiving both said crankshaft reference signal and said camshaft signal pulses and providing at least one cylinder identification reference signal indicative of one particular camshaft rotational position by distinguishing between the various camshaft signal pulses by determining if said camshaft signal pulses occur during two sequential identical polarity states of said crankshaft reference signal, whereby said crankshaft reference signal is utilized not only to provide precise signal transitions related to specific rotational positions of the engine crankshaft, but is also utilized in identifying a specific camshaft reference rotational position.

2. An electronic engine synchronization and timing circuit according to claim 1 wherein said circuitry means utilizes identical polarity transitions of said crankshaft reference signal to trigger gating circuitry means for effectively sampling if camshaft pulses were provided by said camshaft sensor means prior to the occurrence of each of said identical polarity transitions.

3. An electronic engine synchronization and timing circuit according to claim 1 which includes a second stationary camshaft sensor means spaced 180 degrees apart from said first camshaft sensor means about said camshaft axis for also sensing the rotational position of the camshaft body portions and providing in response thereto camshaft sensor signal pulses whose occurrence is related to predetermined camshaft rotational positions, and wherein said circuitry means includes a flip-flop means for receiving said first and second camshaft sensor signal pulses and is set and reset by said first and second camshaft pulses, respectively, an output of said flip-flop being coupled to gating circuitry which effectively samples the output of said flip-flop during crankshaft reference signal transitions of a predetermined polarity, whereby said gating circuitry determines which of said sensors provided the last camshaft signal pulse prior to said crankshaft signal transition.

4. An electronic engine synchronization and timing circuit according to any of claims 1, 2, or 3 wherein said body rotated by said crankshaft has a plurality of peripheral radial projections spaced about said body and wherein said projections and said crankshaft sensor means are constructed such that a pair of identical polarity associated crankshaft sensor pulses are produced for each camshaft signal position pulse with one of these pulses produced immediately prior to and the other produced immediately after the occurrence of the camshaft position pulse.

5. An electronic engine synchronization and timing circuit according to claim 4 which includes circuitry means, as part of said crankshaft position sensor means, for receiving both said camshaft signal pulses and said crankshaft signal pulses and providing in response thereto said crankshaft reference signal, said circuitry having means for utilizing said camshaft and crankshaft signal pulses to provide said crankshaft reference signal with a predetermined polarity transition in response to the first of said crankshaft signal pulse transitions occurring after the occurrence of a camshaft pulse and providing said crankshaft reference signal with an opposite polarity transition in response to the next of said crankshaft sensor pulse transitions.

6. An electronic engine synchronization and timing circuit according to claim 3 wherein said crankshaft and camshaft peripheral portions comprise radial outward projections from said crankshaft and camshaft rotating bodies, respectively.

7. An electronic engine synchronization and timing circuit according to claim 6 wherein there are two camshaft peripheral projections spaced 90 degrees apart with respect to the camshaft rotary body axis, only said first and second camshaft sensor means are positioned about said camshaft for sensing the position of said camshaft projections and wherein there are four crankshaft peripheral projections positioned such that for each camshaft position pulse a pair of associated crankshaft sensor pulses are produced by said crankshaft sensor means with one pulse produced immediately prior to and one pulse produced immediately after each camshaft position pulse, said crankshaft projections being spaced at 90 degree intervals about the axis about which said crankshaft rotary body is rotated.

8. An electronic engine synchronization and timing circuit according to claim 6 wherein there are three camshaft peripheral projections spaced approximately 60 degrees apart with respect to the camshaft rotary body axis, only said first and second camshaft sensor means are positioned about said camshaft for sensing the position of said camshaft projections and wherein there are six crankshaft peripheral projections positioned such that for each camshaft sensor pulse a pair of associated crankshaft sensor pulses are produced by said crankshaft sensor means with one pulse produced immediately prior to and one pulse produced immediately after each camshaft position pulse, said crankshaft projections being spaced at 60 degree intervals about the axis about which said crankshaft rotary body is rotated.

9. An electronic engine synchronization and timing circuit according to claim 6 wherein there are four camshaft peripheral projections spaced approximately 45 degrees apart with respect to the camshaft rotary body axis, only said first and second camshaft sensor means are positioned about said camshaft for sensing the position of said camshaft projections and wherein there are eight crankshaft peripheral projections positioned such that for each camshaft sensor pulse a pair of associated crankshaft sensor pulses are produced by said crankshaft sensor means with one pulse produced immediately prior to and one pulse produced immediately after each camshaft position pulse, said crankshaft projections being spaced at 45 degree intervals about the axis about which said crankshaft rotary body is rotated.

10. An electronic engine synchronization and timing circuit according to claim 3 wherein said crankshaft and camshaft peripheral portions comprise radial outward projections from said crankshaft and camshaft rotating bodies, respectively, wherein there are n camshaft peripheral projections spaced approximately 180/n degrees apart with respect to the camshaft rotary body axis, only said first and second camshaft sensors are positioned about said camshaft for sensing the position of said camshaft projections and wherein there are 2n crankshaft peripheral projections positioned such that for each camshaft position pulse a pair of associated crankshaft sensor pulses are produced by said crankshaft sensor means with one pulse produced immediately prior to and one pulse produced immediately after each camshaft position pulse, said crankshaft projections being spaced at 180/n degree intervals about the axis about which said crankshaft rotary body is rotated, n being an integer more than one.

11. An electronic engine synchronization and timing circuit comprising:

an engine crankshaft driven by an engine at variable speeds and providing cyclic driving movement for engine cylinder pistons;

a crankshaft body rotated about an axis by the crankshaft and having a plurality of identical peripheral portions spaced about said axis;

crankshaft sensor means positioned stationary about said crankshaft body for providing a pulse signal having a plurality of identical pulse transitions at various predetermined crankshaft positions in response to the passage of said crankshaft peripheral portions;

an engine camshaft rotated at one half the rotational speed of said crankshaft;

a camshaft body rotated about an axis by the camshaft and having a plurality of identical peripheral portions;

camshaft sensor means positioned stationary about said camshaft body for developing a plurality of pulses at various predetermined camshaft positions in response to the passage of said camshaft peripheral portions;

said camshaft body and said crankshaft body peripheral portions being arranged for providing a pair of crankshaft pulses between each of said camshaft pulses; and circuitry means for receiving said camshaft pulses and said crankshaft signals and providing in response thereto a crankshaft reference signal, said circuitry means having means for utilizing said camshaft pulses and said crankshaft signals to provide said crankshaft reference signal with a predetermined polarity transition in response to the first of said crankshaft pulse transitions occurring after the occurrence of one of said camshaft pulses and an opposite polarity transition in response to the next of said crankshaft pulse transitions, whereby the occurrence of said camshaft pulses is utilized to distinguish between the different crankshaft angular positions indicated by the identical polarity crankshaft pulse transitions.

12. An electronic engine synchronization and timing circuit according to claim 11 wherein said crankshaft sensor means comprises first and second stationary camshaft sensors spaced 180 degrees apart about said camshaft axis for sensing the rotational position of the camshaft body portions and each providing in response thereto camshaft sensor signal pulses whose occurrence is related to predetermined camshaft rotational positions.

13. An electronic engine synchronization and timing circuit according to any of claims 11 or 12 wherein said crankshaft and camshaft peripheral portions comprise radial outward projections from said crankshaft and camshaft rotating bodies, respectively.

14. An electronic engine synchronization and timing circuit according to claim 13 wherein there are two camshaft peripheral projections spaced 90 degrees apart with respect to the camshaft rotary body axis, only said first and second camshaft sensor means are positioned about said camshaft for sensing the position of said camshaft projections and wherein there are four crankshaft peripheral projections positioned such that for each camshaft sensor pulse a pair of associated crankshaft sensor pulses are produced by said crankshaft sensor means with one pulse produced immediately prior to and one pulse produced immediately after each camshaft position pulse, said crankshaft projections being spaced at 90 degree intervals about the axis about which said crankshaft rotary body is rotated.

15. An electronic engine synchronization and timing circuit according to claim 13 wherein there are three camshaft peripheral projections spaced approximately 60 degrees apart with respect to the camshaft rotary body axis, only said first and second camshaft sensor means are positioned about said camshaft for sensing the position of said camshaft projections and wherein there are six crankshaft peripheral projections positioned such that for each camshaft position pulse a pair of associated crankshaft sensor pulses are produced by said crankshaft sensor means with one pulse produced immediately prior to and one pulse produced immediately after each camshaft position pulse, said crankshaft projections being spaced at 60 degree intervals about the axis about which said crankshaft rotary body is rotated.

16. An electronic engine synchronization and timing circuit according to claim 13 wherein there are four camshaft peripheral projections spaced approximately 45 degrees apart with respect to the camshaft rotary body axis, only said first and second camshaft sensor means are positioned about said camshaft for sensing the position of said camshaft projections and wherein there are eight crankshaft peripheral projections positioned such that for each camshaft position pulse a pair of associated crankshaft sensor pulses are produced by said crankshaft sensor means with one pulse produced immediately prior to and one pulse produced immediately after each camshaft position pulse, said crankshaft projections being spaced at 45 degree intervals about the axis about which said crankshaft rotary body is rotated.

17. An electronic engine synchronization and timing circuit according to claim 13 wherein there are n camshaft peripheral projections spaced approximately 180/n degrees apart with respect to the camshaft rotary body axis, only said first and second camshaft sensors are positioned about said camshaft for sensing the position of said camshaft projections and wherein there are 2n crankshaft peripheral projections positioned such that for each camshaft sensor pulse a pair of associated crankshaft sensor pulses are produced by said crankshaft sensor means with one pulse produced immediately prior to and one pulse produced immediately after each camshaft position pulse, said crankshaft projections being spaced at 180/n degree intervals about the axis about which said crankshaft rotary body is rotated, n being an integer more than one.

* * * * *